Jan. 29, 1957 T. A. ROBERTSON 2,779,378
TIRE TREAD CONSTRUCTION
Filed Nov. 30, 1953 3 Sheets-Sheet 1

INVENTOR.
THOMAS A. ROBERTSON
BY
W. A. Fraser
ATTY-

INVENTOR.
THOMAS A. ROBERTSON
BY
W. A. Fraser
ATTY.

Jan. 29, 1957 T. A. ROBERTSON 2,779,378
TIRE TREAD CONSTRUCTION
Filed Nov. 30, 1953 3 Sheets-Sheet 3

INVENTOR.
THOMAS A. ROBERTSON
BY
W. A. Fraser
ATTY.

United States Patent Office 2,779,378
Patented Jan. 29, 1957

2,779,378

TIRE TREAD CONSTRUCTION

Thomas A. Robertson, Akron, Ohio, assignor to The Firestone Tire & Rubber Company, Akron, Ohio, a corporation of Ohio Application November 30, 1953, Serial No. 395,106

1 Claim. (Cl. 152—209)

This invention relates to improvements in pneumatic tires and, in particular, concerns improvements in treads of pneumatic truck tires molded from rubber or rubberlike material.

The treads of such tires are commonly formed with a pattern comprising upstanding ribs and/or a plurality of studs or bars each of which pattern units presents a working surface to that of the road. The present invention is illustrated by reference to a continuous rib tire; however, it is to be understood that the invention is not to be limited to such continuous ribs, but that in their stead a series of circumferentially extending broken ribs may be used without departing from the spirit of the invention. While the tread embodying the present invention has been designed with its esthetic appeal considered, its mechanical function is of primary importance.

The general object of the present invention is to provide a truck tire tread with deeper tread grooves and greater volume of material in the upstanding traction elements than has been practical in the prior art truck tire treads.

A more specific object of said invention is to provide a tread, for truck or passenger tires, which tread comprises circumferentially extending, upstanding ribs defining deep grooves therebetween, with the radial outer portion of said ribs being straight and the radial inner portion of the same ribs being zigzag; the straight portion of said ribs having longitudinally spaced, transversely extending, narrow grooves for traction; said zigzag portion being wider than the straight portion to provide initial lateral stability to said straight portion and by its zigzag angular form to provide effective traction characteristics when the ribs are worn enough to expose said zigzag portion to the road surface.

Another object of the invention is to provide a rib type tire tread with said narrow grooves extending only part way across and approximately one-third the depth of the ribs at the portion in which they occur, said narrow grooves opening radially outwardly of the ribs and on a lateral side of the ribs on a laterally and radially inwardly sloping portion of the ribs so that as the ribs wear the open ends of the narrow grooves progressively become closed, whereby wiping type of wear at the edges of the narrow grooves will be prevented from developing to an objectionable degree.

Another object of the invention is to provide a rib type tread with improved stone ejecting characteristics.

A further object is to provide a rib type tread having deep grooves between the ribs, said grooves being zigzag at their bottom to prevent tread cracking.

A still further object is to provide a tread construction for a truck tire with improved traction characteristics that will run quiet until worn smooth.

Referring to the drawings.

Figure 2:
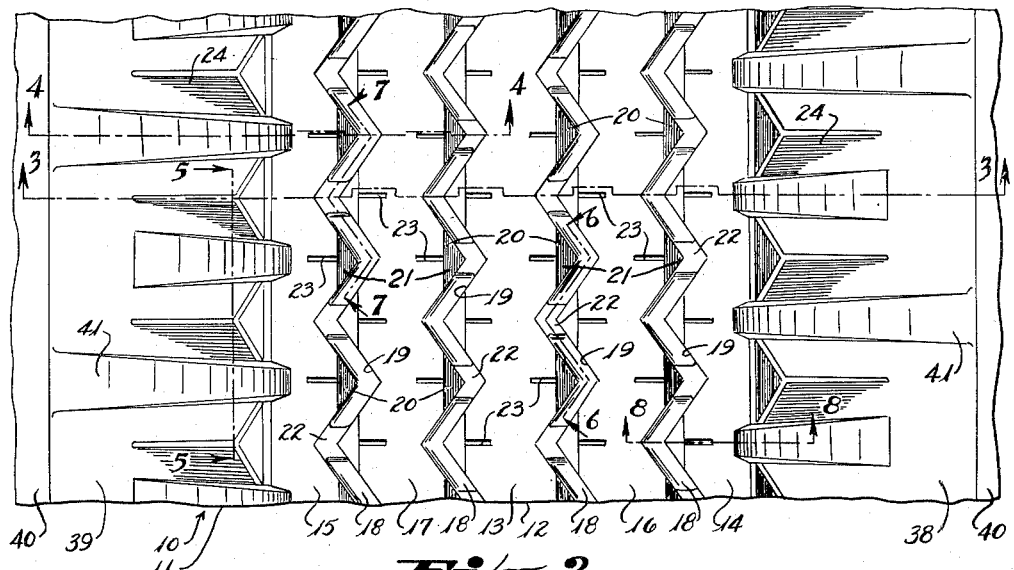
Fig. 2 is an enlarged fragmentary plan view of the tread of the tire of Fig. 1.
Figure 5:
Figure 6:
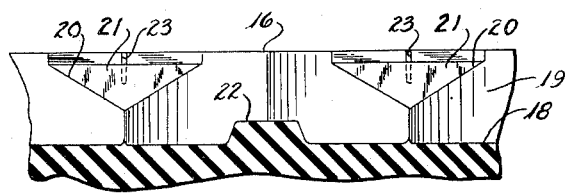
Figure 7:
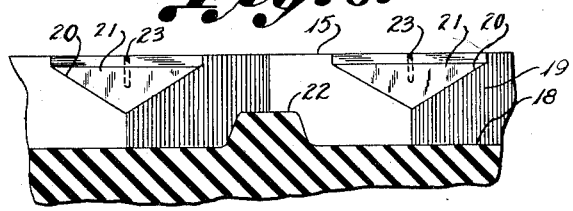
Figure 3:
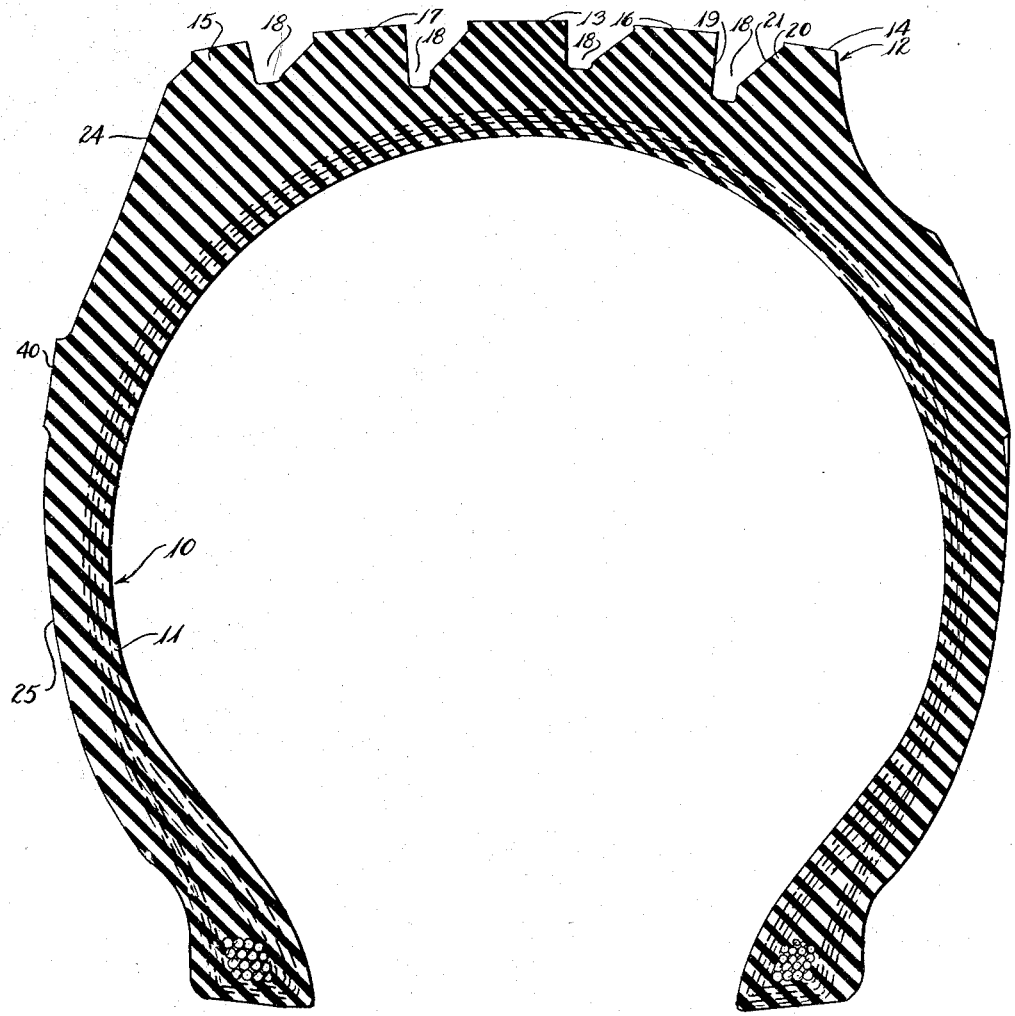
Fig. 3 is an enlarged sectional view taken on line 3—3 of Fig. 2.
Figures 4, 8:
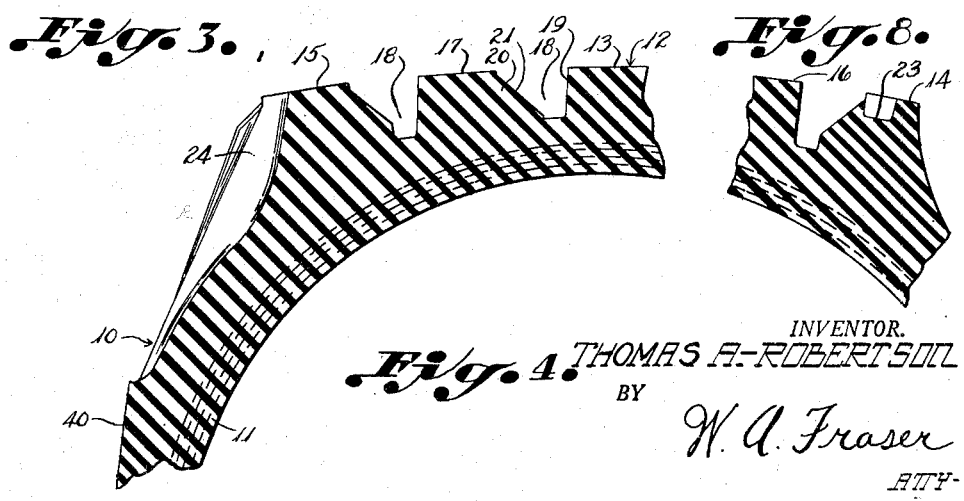
Fig. 4 is an enlarged fragmentary sectional view taken on line 4—4 of Fig. 2.

Figs. 5, 6, 7 and 8 are enlarged fragmentary sectional views taken on lines 5—5, 6—6, 7—7 and 8—8 of Fig. 2, respectively.

Referring to the drawings in detail there is shown a tire casing 10 having a body portion 11 and a tread portion 12. The tread comprises a center rib 13, shoulder ribs 14 and 15, and ribs 16 and 17 intermediate said shoulder ribs and said center rib, there being circumferential grooves 18 defined by adjacent ribs. The lateral sides of said ribs that define grooves 18 are formed with longitudinally spaced notches or recesses 19 which extend from the road contact surface of the rib to the bottom of grooves 18. The portions of the adjacent ribs confronting notches 19 have projecting rib bracing portions 20 which extend laterally of the ribs into said notches, projecting portion 20 being beveled from substantially the road contact surface of said ribs to a point a short distance from the bottom of the grooves 18 as will best be seen by reference to Figs. 2, 6 and 7. Radially outwardly facing surfaces 21 of projections 20 form triangles having their apices within and their bases without said notches, the apices of said triangles, as just indiciated, terminating a short distance radially outwardly of the bottom of grooves 18. It will now be seen, by reference to the drawings, that grooves 18 are of uniform and narrower width radially inwardly of said apices of said triangles than radially outwardly thereof, the width of grooves 18 progressively widening from said apices to the bases of the triangular surface 21.

Braces 22 rise from the bottom of grooves 18 at each alternate notch along grooves 18, braces 22 having a height of approximately one-third of the height of said ribs, said braces joining and being integral with said ribs. The center and intermediate ribs are provided with narrow transversely extending grooves that are disposed at said beveled portion and extend radially inwardly of said ribs to approximately one-third the rib height, said narrow grooves extending transversely of said ribs approximately one-half the width of the initial road contact surface of the ribs where said narrow groove occurs and so disposed that they open on the lateral side of the rib at said beveled portion for a short distance radially inwardly of the rib, so that as the ribs wear in service, the open end of the narrow grooves will become closed, whereby any wiping wear which may have developed at the edge of said narrow grooves will be prevented from developing further when the end of said narrow grooves are worn to said closed condition. Said shoulder ribs are somewhat narrower than the center and intermediate ribs and are provided with lateral supports at braces 24 extending from substantially the road contacting surface of said shoulder ribs radially inwardly a substantial distance to a point substantially at the junction of the sidewall 25 and the tread 12.

It will now be seen that in operation the load on tire 10 at first will be carried on the substantially straight smooth surface of said ribs, which ribs are firmly braced against lateral instability by the sloped portions 20 which project into notches 19, and because of this bracing the grooves between said ribs may be deeper than otherwise would be practical and have a laterally stable tire. It will also be seen that the narrow grooves 23, closely spaced along said ribs, provide edges presented to the road surface to impart good traction characteristics to the surface of said ribs before they become worn. It will further be seen, however, that in addition to grooves 23, the notched edges of the ribs provide a further initial traction element.

Figure 1:
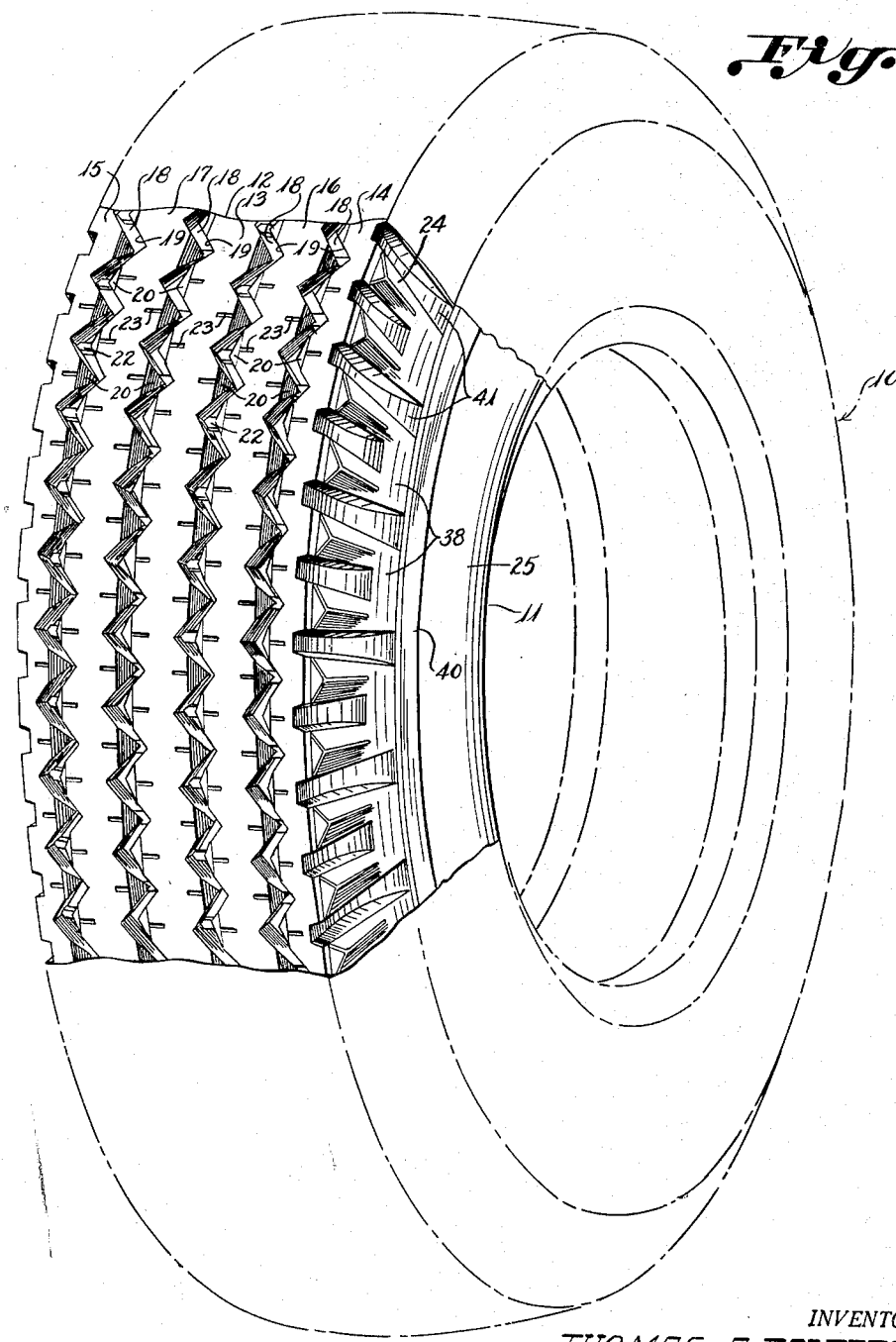
Fig. 1 is a perspective view of a tire embodying the present invention.

As will be seen from reference to Figs. 1 and 2, the beveled surfaces 20 adjoin the grooves 18, said beveled surfaces alternately sloping in opposite direction so as to form the grooves 18 with a pronounced sloping side from the apices of said triangular surfaces 21 outwardly at all points along grooves 18 whereby stones are prevented from lodging in the circumferentially extending grooves. The lateral stability of said ribs imparted by sloped portions 20 prevents excessive movement of material of the tread at the bottom of grooves 18 and thereby effectively reduces the tendency for tread cracking in the bottom of the grooves. As is well known in the tire industry the tendency of cracking in the bottom of tread grooves develops most readily in tread grooves that extend circumferentially of the tire. It is to be noted that in applicant's structure, the bottoms of grooves 18 follow a zigzag course and thereby reduces the so called groove cracking over such cracking that would occur in a straight groove extending circumferentially of the tire. Additionally, it is to be noted that if a tread crack should start to develop in the bottom of grooves 18 that it would immediately encounter braces 22 which, it has been found, effectively blocks continuation of the crack. The foregoing description of applicant's structure identifies structural features which are adapted to reduce cracks in the grooves, these features being reduced movement of tread material at bottoms of tread grooves by lateral bracing of the tread ribs by sloped members 20; zigzag tread grooves; and the provision of tie-in braces which extend completely across grooves 18 and block the progressive development of a groove crack.

Coming now to the shoulder ribs 14 and 15, it will be noted that their lateral inner sides have the same characteristics as do the corresponding sides of the center and intermediate ribs. The lateral outer sides 38 and 39 of said shoulder ribs extend radially inwardly and laterally outwardly to a point on the sidewall of the tire substantially below the inside crown of the tire and terminate in scuff ribs 40. It is to be noted that lateral outer sides 38 and 39 are indented by deep recesses 41, said recesses extending from substantially the road contact surface of the shoulder ribs a first distance substantially perpendicular to the plane of the axis of the tire, and a further distance radially inwardly and laterally outwardly to said scuff ribs 40. It is to be noted that said shoulder ribs are narrower than the center or intermediate ribs whereby the volume of rubber in the shoulder of the tire tread is less than it otherwise would be and that recess or indentations 41 provide additional surface at the thick shoulder of the tread whereby heat generated in said shoulder may be dissipated by radiation to the atmosphere. The deep recesses 41 are also effective in providing additional traction when the tire 10 is run off the road in soft ground or is run in deep snow.

The invention has been illustrated in reference to a five-rib tread tire, but the invention is not to be limited to such a tire as any number of ribs found satisfactory may be used. The invention includes all features of patentable novelty residing in the foregoing description and the accompanying drawings.

What is claimed is:

A tire comprising a tread portion having circumferentially extending laterally spaced continuous road contacting ribs defining circumferentially extending grooves therebetween, one said ribs being disposed at each shoulder of the tire with intermediate ribs between the shoulder ribs, said intermediate ribs having a radially extending edge portion of short extent relative to the height of the rib of which it is a part; said intermediate ribs having notches extending laterally into the sides thereof, said notches occurring at short intervals longitudinally of said ribs alternately on one side and the other side thereof; said ribs radially inwardly from the initial road contact surface thereof having laterally and radially inwardly sloped projections disposed opposite to and extending into said notches, the bottom portion of said projections being triangular in lateral cross-section, the spacing of said projections longitudinally of said intermediate ribs being substantially the same as the extent of a said projection longitudinally of said intermediate ribs, said ribs having narrow grooves opening radially outwardly of the tread and being disposed at the edge of said ribs adjacent to and laterally inwardly from said projections, said narrow grooves extending radially inwardly of the ribs approximately one-third the depth thereof and transversely of the ribs approximately one-half of the initial width of the rib road contact surface at the point said narrow grooves occur; the bottom of the circumferentially extending grooves defined by said ribs being uniform in width and extending in a zigzag course circumferentially of the tire.

References Cited in the file of this patent

UNITED STATES PATENTS

| | | |
|---|---|---|
| 2,265,543 | Overman | Dec. 9, 1941 |
| 2,272,879 | Hargraves | Feb. 10, 1942 |
| 2,404,579 | Coben | July 23, 1946 |
| 2,459,750 | Dybvig | Jan. 18, 1949 |
| 2,604,920 | Kirby | July 29, 1952 |
| 2,701,598 | Gray | Feb. 8, 1955 |

FOREIGN PATENTS

| | | |
|---|---|---|
| 819,836 | France | July 19, 1937 |
| 987,700 | France | Apr. 18, 1951 |